United States Patent [19]
Buchanan et al.

[11] Patent Number: 6,123,325
[45] Date of Patent: Sep. 26, 2000

[54] AIRTIGHT END RETAINER FOR AN AIRSPRING

[75] Inventors: Karen Marie Buchanan, Mogadore; Roger Allen Strickler, Akron, both of Ohio

[73] Assignee: The Goodyear Tire & Rubber Company, Akron, Ohio

[21] Appl. No.: 09/084,761

[22] Filed: May 26, 1998

[51] Int. Cl.[7] .................................................. F16F 5/00
[52] U.S. Cl. ........................ 267/122; 411/41; 267/64.27
[58] Field of Search .............................. 267/122, 64.19, 267/64.21, 64.23, 64.27, 64.24; 92/122; 411/39, 40, 41, 45–50, 52, 53, 338, 339, 508–510

[56] References Cited

U.S. PATENT DOCUMENTS

| | | | |
|---|---|---|---|
| 2,960,333 | 11/1960 | McGavern, Jr. et al. | 267/64.27 |
| 3,596,895 | 8/1971 | Hirtreiter | 267/64.27 |
| 4,564,177 | 1/1986 | Leonard | 267/64.24 |
| 4,804,303 | 2/1989 | Statkus | 411/41 |
| 5,143,500 | 9/1992 | Schuring et al. | 411/339 |
| 5,535,994 | 7/1996 | Safreed, Jr. | 267/64.27 |

Primary Examiner—Robert J. Oberleitner
Assistant Examiner—Pamela J. Lipka
Attorney, Agent, or Firm—Nancy T Krawczyk

[57] ABSTRACT

An airtight end retainer assembly has a premolded body with apertures and a seat area for receiving a combination stud insert, having a head, which is press fitted into the body with an o-ring seal therebetween. The retainer assembly is for use in an airspring assembly. Combinations of complementary shapes between a first body aperture and the stud head compared to a second body aperture and a central portion of the stud insert prevent relative rotation between the body and the stud insert.

2 Claims, 3 Drawing Sheets

AIRTIGHT END RETAINER FOR AN AIRSPRING

FIELD OF THE INVENTION

This invention relates to an airspring having an end retainer assembly which provides an airtight means for pressurizing the airspring.

BACKGROUND OF THE INVENTION

Prior art airsprings had lower retainer assemblies where the combination studs were imbedded into the plastic lower retainer body during injection molding (see FIG. 1). Due to variations in shrinkage between the plastic body and the metal stud, air leaks occurred at the plastic/metal interface.

The present invention has solved this problem by molding a retainer body, having a seat, first then press fitting a combination stud, having a head, into the retainer body with an o-ring in between.

SUMMARY OF THE INVENTION

In accordance with the practice of the present invention, there is provided an airtight end retainer assembly 25 for an airspring comprising:

a. a retainer body 18 having an outer cylindrical clamp detail portion 40 capable of retaining an airspring flex member 14 in clamping engagement, a first body aperture 42 having a seat area 41, and a second body aperture 43 adapted to receive a combination stud insert 16;

b. a combination stud insert 16 having a head 23 adapted to be received in the body seat area 41, a central portion 44 adapted to be received in the second body aperture 43, and an attachment portion 45 for mounting to a mounting bracket in a designated application; and;

c. an o-ring seal 17 between the seat 41 of the body 18 and the head 23 of the stud insert 16;

wherein at least one of the mated combinations of the first body aperture 42 and the stud insert head 23 or the second body aperture 43 and the stud central portion 44 is non-cylindrical.

There is also provided an airspring assembly comprising:

a. first end retainer;

b. an end retainer assembly as described above;

c. a flex member connected between the retainer and the retainer assembly.

DESCRIPTION OF THE INVENTION

Figure 1:
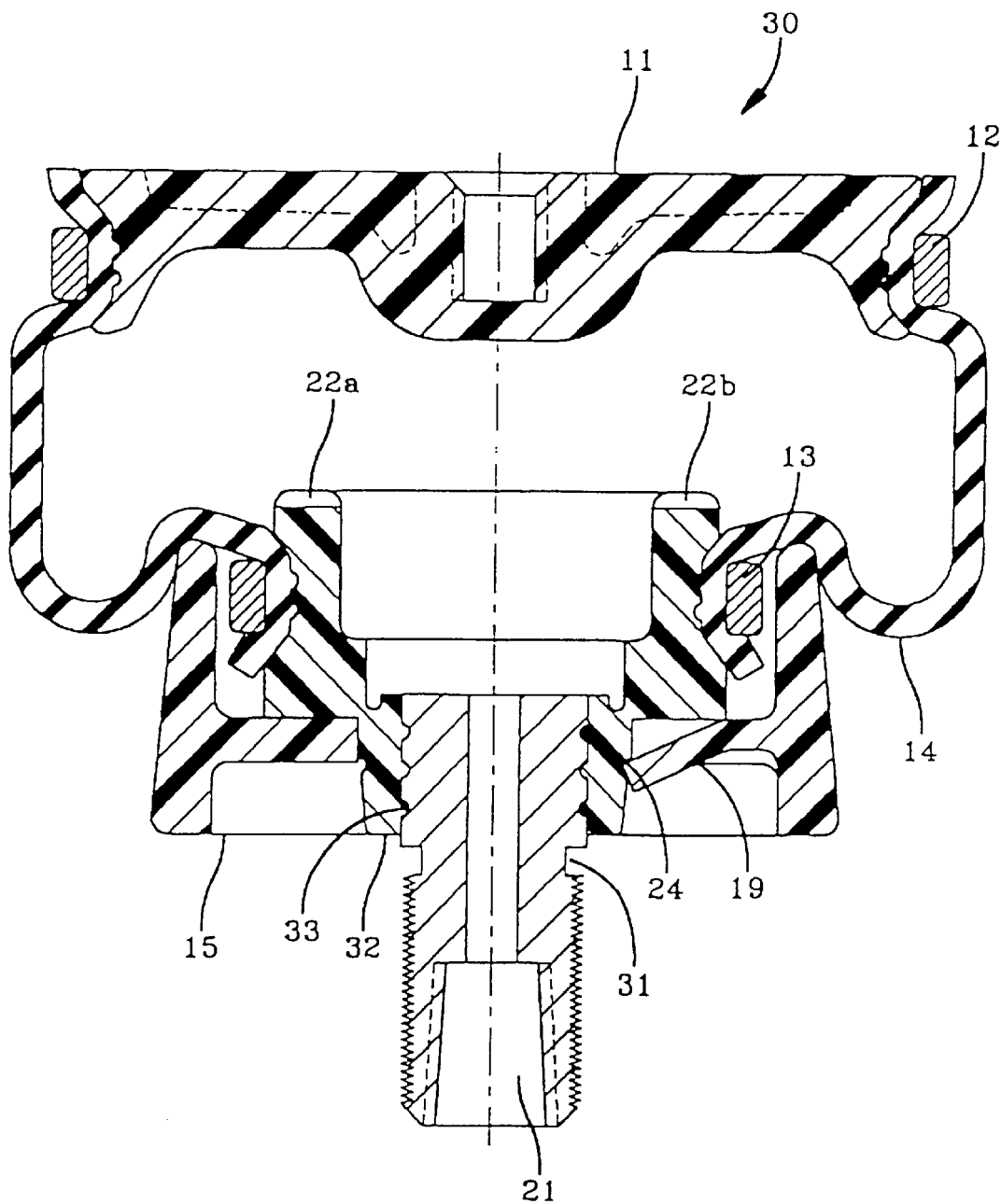
FIG. 1 is a cross-sectional view of a prior art airspring.

The prior art airspring assembly of FIG. 1 shown generally at 30 has an upper retainer of 11 and a lower retainer 32 with a flex member 14 attached between the retainers by upper crimp ring 12 and lower crimp ring 13. The piston 15 is attached to the lower retainer 32 and held in place by snap tab 19 in snap tab locking groove 24. Lower retainer body 32 has grooves 22a and 22b which allow for the air to enter the airspring through air inlet 21 when the upper retainer is in the deflated position atop lower retainer 32. The prior art lower retainer body is molded around the combination stud 31 having grooves 33.

Figure 2:
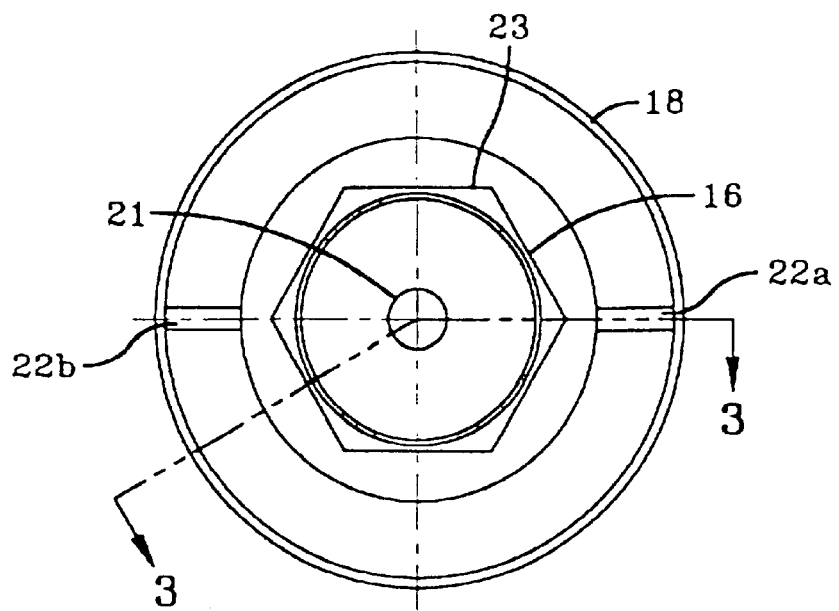
FIG. 2 is a top plan view of the end retainer assembly of the present invention.
Figure 3:
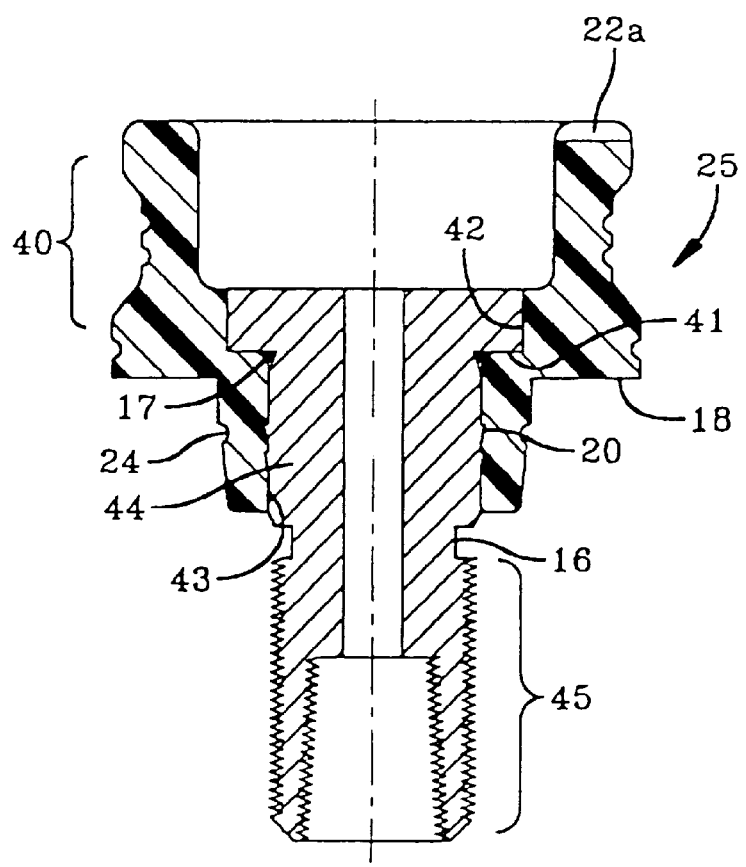
FIG. 3 is a cross-sectional view of the end retainer assembly of the present invention taken along line 3—3 of FIG. 2.
Figure 4:
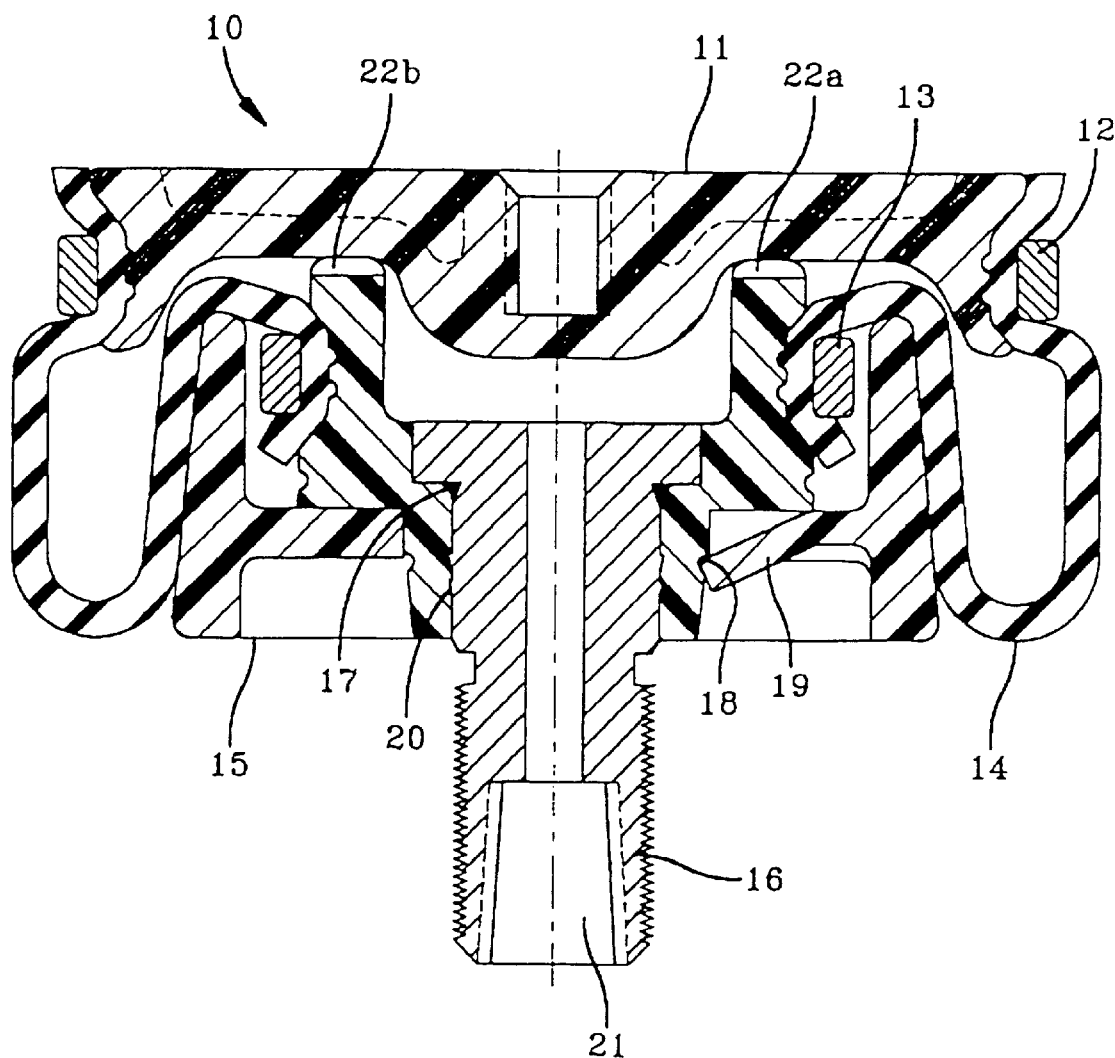
FIG. 4 is a cross-sectional view of an airspring assembly including the end retainer assembly of the present invention.

Referring to FIGS. 2, 3 and 4, there is shown an airspring assembly generally at 10 having an end retainer 11 and end retainer assembly 25. Flex member 14 is connected between the end retainer 11 and end retainer assembly 25 by upper crimp ring 12 and lower crimp ring 13, respectively. Piston 15 is attached to the end retainer assembly 25 by snap tab 19.

The end retainer assembly shown generally at 25 has the end retainer body 18 snap tab locking groove 24 and air slots 22a and 22b. The end retainer body 18 has an outer cylindrical clamp detail portion 40 capable of retaining an airspring flex member 14 in clamping engagement. The body 18 has a first body aperture 42 having a seat area 41 and a second body aperture 43 adapted to receive a combination stud insert 16. The combination stud insert 16 has a head 23 adapted to be received in the body seat 41, a central portion 44 adapted to be received in the second body aperture 43 and an attachment portion 45 for mounting to a bracket in a designated application.

The combination stud insert 16 is press fitted into the first and second body apertures 42, 43 of the retainer body 18 and held in place by at least one barb 20. Between the seat 41 of the retainer body 18 and the head 23 of the stud insert 16 is an o-ring 17. The head 23 has a shape to fit in the seat 41 of the retainer body 18. To prevent the combination stud insert 16 from rotating relative to the retainer body 18 when the airspring assembly is attached to a mounting bracket of a vehicle, various combinations of shapes of the first body aperture 42, the stud central portion 44, the second body aperture 43 and the stud insert head 23 can be made.

The first body aperture 42 and stud insert head 23 combination can be cylindrical while the second body aperture 43 and the stud central portion 44 combination is non-cylindrical. If the first body aperture 42 and stud insert head 23 combination is non-cylindrical, the second body aperture 44 and stud central portion 44 can be cylindrical. The third possibility is that both the combinations can be non-cylindrical. Air to pressurize the airspring assembly 10 enters through air inlet 21.

The end retainer assembly 25 of the present invention has been found to hold air in airsprings as well as those machined out of one block of aluminum. This is particularly useful in closed air applications where the airspring is pressurized and then the source of the air is shut off.

While certain representative embodiments and details have been shown for the purpose of illustrating the invention, it will be apparent to those skilled in this art that various changes and modifications may be made therein without departing from the spirit or scope of the invention.

What is claimed is:

1. An airtight lower retainer assembly for an airspring comprising:

a. a retainer body (18) having an outer cylindrical clamp detail portion (40) capable of retaining an airspring flex member (14) in clamping engagement, a first body aperture 42 having a seat area (41), and a second body aperture (43) adapted to receive a combination stud insert (16);

b. a combination stud insert (16) having a head (23) adapted to be received in the body seat area (41), a central portion (44) adapted to be received in the second body aperture (43), and an attachment portion (45) for mounting to a mounting bracket; and;

c. an o-ring seal (17) between the seat (41) of the body (18) and the head (23) of the stud insert (16);

wherein at least one of the mated combinations of the first body aperture (42) and the stud insert head (23) or the second body aperture (43) and the stud central portion (44) is non-cylindrical.

2. An airspring assembly comprising:

a. an end retainer;

b. an end retainer assembly; and c. a flex member connected between the retainers;

wherein the end retainer assembly is in accordance with claim 1.

\* \* \* \* \*